US010334540B2

(12) United States Patent
Jeong et al.

(10) Patent No.: US 10,334,540 B2
(45) Date of Patent: Jun. 25, 2019

(54) UPLINK SYNCHRONIZATION DEVICE AND METHOD OF WIRELESS COMMUNICATION SYSTEM

(71) Applicant: Samsung Electronics Co., Ltd., Gyeonggi-do (KR)

(72) Inventors: Cheol Jeong, Seongnam-si (KR); Jeong-Ho Park, Seoul (KR); Jae-Won Kim, Seoul (KR); Hyun-Kyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/327,018

(22) PCT Filed: Jul. 17, 2015

(86) PCT No.: PCT/KR2015/007453
§ 371 (c)(1),
(2) Date: Jan. 17, 2017

(87) PCT Pub. No.: WO2016/010396
PCT Pub. Date: Jan. 21, 2016

(65) Prior Publication Data
US 2017/0164310 A1    Jun. 8, 2017

(30) Foreign Application Priority Data
Jul. 17, 2014    (KR) .................. 10-2014-0090450

(51) Int. Cl.
*H04W 56/00*    (2009.01)
(52) U.S. Cl.
CPC ... *H04W 56/0005* (2013.01); *H04W 56/0045* (2013.01)
(58) Field of Classification Search
CPC ................... H04W 56/0005; H04W 56/0045
See application file for complete search history.

(56) References Cited

U.S. PATENT DOCUMENTS

2009/0086714 A1    4/2009    Song et al.
2013/0058309 A1    3/2013    Kuo
(Continued)

FOREIGN PATENT DOCUMENTS

KR    20090032185 A    4/2009
WO    2013165138 A1    11/2013

OTHER PUBLICATIONS

LG Electronics, "Timing advance for TDD-FDD carrier aggregation," R1-140314, 3GPP TSG RAN WG1 Meeting #76, Prague, Czech Republic, Feb. 10-14, 2014, 4 pages.
(Continued)

*Primary Examiner* — Phuc H Tran

(57) ABSTRACT

The present disclosure relates to a pre-5th-Generation (5G) or 5G communication system to be provided for supporting higher data rates Beyond 4th-Generation (4G) communication system such as Long Term Evolution (LTE). Embodiments of the present invention are to provide a method and apparatus for performing uplink synchronization in a wireless communication system. According to an embodiment of the present invention, a method of operating a terminal in a wireless communication system includes the processes of: receiving an adjustment message including a first timing advance (TA) value from a first base station; and transmitting an uplink signal to a second base station based on a second TA value for the second base station that is determined based on the first TA value. According to an embodiment of the present invention, it is possible to decrease the overhead of an uplink resource by adjusting an uplink signal time transmitted to other base stations or other cells by using information for uplink synchronization in a base station or cell in a wireless communication system.

17 Claims, 18 Drawing Sheets

(56) References Cited

U.S. PATENT DOCUMENTS

| | | | |
|---|---|---|---|
| 2013/0250925 A1* | 9/2013 | Lohr | H04W 72/0446 370/336 |
| 2013/0301619 A1 | 11/2013 | Singh et al. | |
| 2014/0029586 A1* | 1/2014 | Loehr | H04W 56/0005 370/336 |
| 2014/0050186 A1* | 2/2014 | Kim | H04W 56/0045 370/329 |
| 2014/0050205 A1 | 2/2014 | Ahn et al. | |
| 2014/0161110 A1* | 6/2014 | Kim | H04L 5/001 370/336 |
| 2015/0043543 A1* | 2/2015 | Uchino | H04W 56/0045 370/336 |
| 2015/0063317 A1* | 3/2015 | Park | H04W 56/0005 370/336 |

OTHER PUBLICATIONS

Texas Instruments, "Support of Multiple Timing Advance Commands," R1-112153, 3GPP TSG RAN WG1 #66, Athens, Greece, Aug. 22-26, 2011, 4 pages.
Panasonic, "Comparison of Uplink Time Alignment Synchronization Methods for SCell TA Groups," R1-112350, 3GPP TSG-RAN WG1 Meeting #66, Athens, Greece, Aug. 22-26, 2011, 6 pages.
Extended European Search Report regarding Application No. 15822197.8, dated Jan. 18, 2018, 8 pages.

\* cited by examiner

UPLINK SYNCHRONIZATION DEVICE AND METHOD OF WIRELESS COMMUNICATION SYSTEM

CROSS-REFERENCE TO RELATED APPLICATION(S)

The present application claims priority under 35 U.S.C. § 365 to International Patent Application No. PCT/KR2015/007453 filed Jul. 17, 2015, entitled "UPLINK SYNCHRONIZATION DEVICE AND METHOD OF WIRELESS COMMUNICATION SYSTEM", and Korean Patent Application No. 10-2014-0090450 filed Jul. 17, 2014, each of which are incorporated herein by reference into the present disclosure as if fully set forth herein.

TECHNICAL FIELD

The present invention relates to synchronization in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

When signals received from multiple terminals by a base station in a wireless communication system are not synchronized with each other, interference may occur. For example, interference may occur between subcarriers and between continuous subframes in the LTE system. The occurred interference may increase a packet error rate, and this could lead to performance degradation of the system. Therefore, it is important to perform uplink synchronization of terminals.

DETAILED DESCRIPTION OF THE PRESENT INVENTION

Technical Problem

Therefore, embodiments of the present invention provide a method and apparatus for performing uplink synchronization in a wireless communication system.

Embodiments of the present invention are to provide a method and apparatus for transmitting an uplink signal to reduce the overhead of channel structure for performing uplink synchronization in a wireless communication system.

Technical Solution

According to an embodiment of the present invention, an operation method for a terminal in a wireless communication system is provided. The method includes: receiving an adjustment message including a first timing advance (TA) value from a first base station; and transmitting an uplink signal to a second base station based on a second TA value for the second base station, which is set based on the first TA value.

According to another embodiment of the present invention, an operation method for a first base station in a wireless communication system is provided. The method includes: transmitting an adjustment message including a first timing advance (TA) value to a terminal; and transmitting an uplink transmission command message to the terminal such that the terminal transmits an uplink signal to a second base station based on a second TA value for the second base station, which is set based on the first TA value.

According to another embodiment of the present invention, an operation method for a second base station in a wireless communication system is provided. The method includes: receiving, from a terminal, an uplink signal transmitted based on a second timing advance (TA) value for a second base station, wherein the second TA value is set based on a first TA value for a first base station.

According to another embodiment of the present invention, a terminal device for a wireless communication system is provided. The terminal device includes: a receiver configured to receive an adjustment message including a first timing advance (TA) value from a first base station; and a transmitter configured to transmit an uplink signal to a second base station based on a second TA value for the second base station, which is set based on the first TA value.

According to another embodiment of the present invention, a first base station for a wireless communication system is provided. The first base station includes: a control unit configured to generate an adjustment message including a first timing advance (TA) value and an uplink transmission command message; and a transmitter. The transmitter transmits the adjustment message, and transmits an uplink transmission command message to a terminal such that the terminal transmits an uplink signal to a second base station based on a second TA value for the second base station, which is set based on the first TA value.

According to another embodiment of the present invention, a second base station for a wireless communication system is provided. The second base station includes a receiver configured to receive, from a terminal, an uplink signal transmitted based on a second timing advance (TA) value for a second base station. The second TA value is set based on a first TA value for a first base station.

Advantageous Effects of Invention

According to embodiments of the present invention, it is possible to reduce the overhead of an uplink resource by adjusting the time at which an uplink signal is transmitted to other base stations or other cells, using information for uplink synchronization in a base station or a cell in a wireless communication system.

BRIEF DESCRIPTION OF THE DRAWINGS

The following description is made with reference to the accompanying drawings for a more complete understanding of the present invention and effects thereof, and the same reference numerals indicate the same parts.

MODE FOR CARRYING OUT THE PRESENT INVENTION

In this patent specification, FIGS. 1A to 16 used for describing principles of the present invention are merely for examples and should not be interpreted to limit the scope of the present invention. A person skilled in the art will appreciate that the principles of the present invention may be implemented in an arbitrary wireless communication system and beamforming based wireless communication system.

Hereinafter, an uplink synchronization method and apparatus which can reduce the overhead of uplink resources while performing uplink synchronization between terminals in a wireless communication system according to embodiments of the present invention will be discussed. Embodiments of the present invention may be applied to a wireless communication system using a Long Term Evolution (LTE) scheme. In addition, embodiments of the present invention may be applied to a wireless communication system using a beam-forming technology. In addition, embodiments of the present invention may be applied to a case where the wireless communication system using the LTE scheme and the wireless communication system using the beam-forming technology co-exist with each other.

One example of performing uplink synchronization between terminals in the LTE system uses a Timing Advance (TA) value. The terminal transmits an uplink signal advanced by a predetermined time relative to downlink signal synchronization. The advanced time is referred to as Timing Advance (TA), and is a value notified to the terminal by the base station. The base station may adjust the TA value for each terminal so as to perform uplink synchronization between terminals.

In an environment where multiple different wireless communication systems (3G, 4G, etc.) coexist with each other, a terminal performs random access procedure at every time the terminal accesses to each wireless communication system. Here, the base station calculates a TA value that has to be applied by the base station, by using an uplink signal (e.g., for the LTE system, a random access preamble, a physical uplink shared channel, a sounding reference signal, etc.) transmitted from the base station. When the terminal uses multiple carriers at the same time in one wireless communication system, and a different TA value is applied for each carrier, the terminal should transmit an uplink signal for each carrier.

In a wireless communication system using a beam-forming technology in a high frequency band, a terminal and a base station operate multiple beams, respectively. Since multiple pairs of transmission beams of the terminal and reception beams of the base station exist in the uplink, the terminal should transmit uplink signals for all of the beam pairs when accessing the system. The base station selects a pair of beams having the best channel quality and calculates a TA value for the pair of beams that have to be applied by the terminal.

Figure 1A:
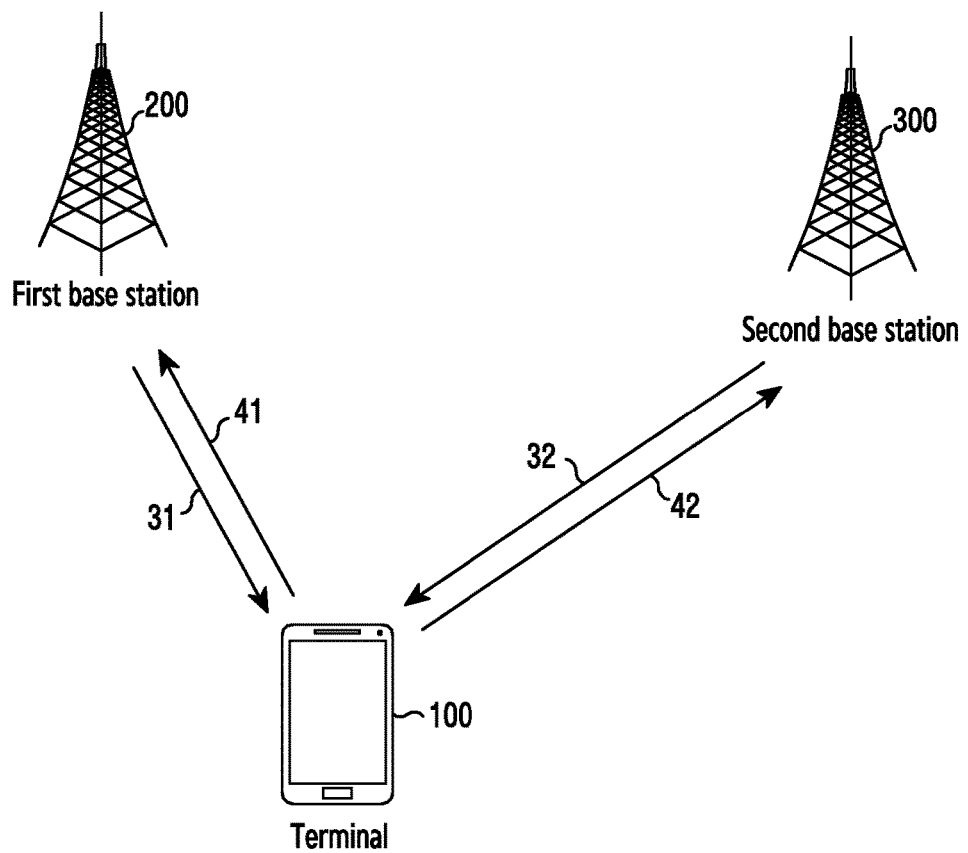
FIGS. 1A to 1C are diagrams illustrating a configuration of a wireless communication system to which an uplink synchronization operation is applied according to embodiments of the present invention.
Figure 1B:
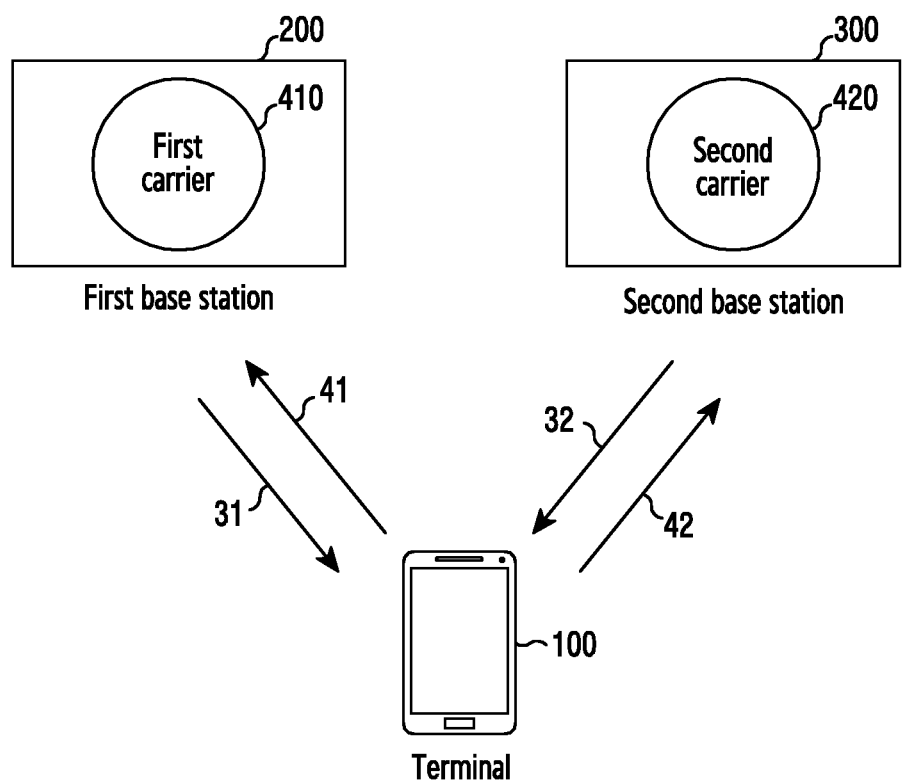
Figure 1C:
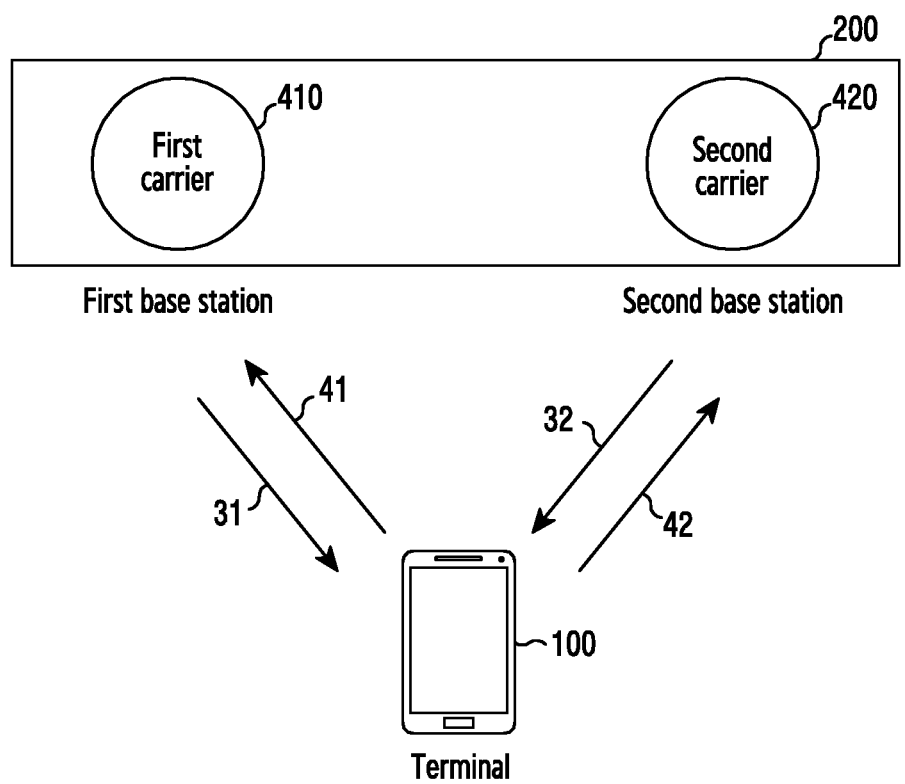

FIGS. 1A to 1C are diagrams illustrating a configuration of a wireless communication system to which an uplink synchronization operation is applied according to embodiments of the present invention.

Referring to FIG. 1A, a terminal 100 communicates with two base stations 200 and 300. The terminal 100 receives downlink reference signals 31 and 32 from a first base station 200 and a second base station 300, respectively. The terminal 100 should know information for uplink synchronization (for example, a TA value) in order to transmit uplink signals 41 and 42 to the base stations 200 and 300, respectively.

In an embodiment, the base station 200 and base station 300 use the same Radio Access Technology (RAT). For example, the base station 200 and base station 300 use the LTE scheme. In another embodiment, the base station 200 and base station 300 use different RATs. For example, the base station 200 uses the LTE scheme, and the base station 300 uses a Wireless Gigabits (Wi-Gig) scheme.

In an embodiment, the base station 200 and base station 300 are located at geographically different positions. In another embodiment, the base station 200 and base station 300 are located at geographically same position.

In an embodiment, the base station 200 and base station 300 use the same frequency domain. In another embodiment, frequency domains used by the base station 200 and base station 300 are different from each other.

Referring to FIG. 1B, the terminal 100 communicates with two base stations 200 and 300 located at physically different positions. The base station 200 transmits and receives a signal to and from the terminal 100 through a first carrier 410 in a first frequency domain. The base station 300 transmits and receives signals to and from the terminal 100 through a second carrier 420 in a second frequency domain. The first carrier 410 and the second carrier 420 may be used together based on a carrier aggregation technology. In this case, the base station 200 may be a base station of an LTE cell, that is, a primary cell (PCell), and the base station 300 may be a base station of a secondary cell (SCell).

In an embodiment, both the first carrier 410 and the second carrier 420 may be carriers of an LTE frequency band. In another embodiment, the first carrier 410 may be a carrier of the LTE frequency band, and the second carrier 420 may be a carrier of the millimeter wave (mmWave) band. In this case, frame structures of the first carrier 410 and second carrier 420 are different from each other.

Referring to FIG. 1C, the terminal 100 communicates with the base station 200. The base station 200 transmits and receives signals to and from the terminal 100 through a first carrier 410 in a first frequency domain. In addition, the base station 200 transmits and receives signals to and from the terminal 100 through a second carrier 420 in the second frequency domain. The first carrier 410 and the second carrier 420 may be used together based on the carrier aggregation technology. In this case, the base station 200 may be a base station of the LTE cell, i.e., the primary cell (PCell), and the base station 300 may be a base station of the secondary cell (SCell).

In an embodiment, both the first carrier 410 and the second carrier 420 may be carriers of the LTE frequency band. In another embodiment, the first carrier 410 may be a carrier of the LTE frequency band, and the second carrier 420 may be a carrier in the millimeter wave (mm Wave) band. In this case, the frame structures of the first carrier 410 and second carrier 420 are different from each other.

Figure 2:
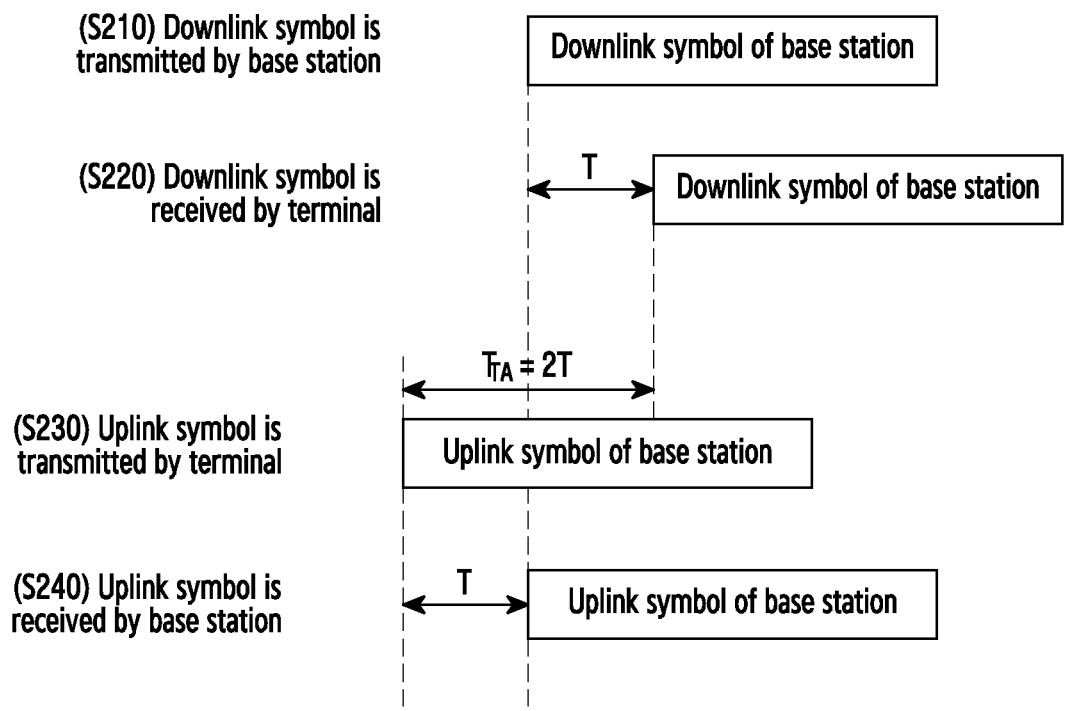
FIG. 2 is a diagram illustrating an example of performing uplink symbol synchronization in a wireless communication system.

FIG. 2 is a diagram illustrating an example of performing uplink symbol synchronization in a wireless communication system. Here, an example of performing uplink symbol synchronization by a terminal, using a TA value received from the base station is shown.

Referring to FIG. 2, a downlink symbol transmitted by the base station (indicated by reference numeral S210) is delayed by a T time and then arrives at a terminal (indicated by reference numeral S220). The terminal receives a TA adjustment message from the base station to calculate a $T_{TA}$ value. When transmitting an uplink signal, the terminal performs uplink signal synchronization by advancing the $T_{TA}$ value from a time point of receiving the downlink symbol of the base station and then transmits the same (indicated by reference numeral S230). Since all terminals in the base station transmit the uplink signal using the above method, synchronization for uplink signals of the terminal received by the base station can be performed. The base station receives uplink signals such as a random access preamble, a sounding reference signal and the like, transmitted by the terminal, so as to estimate the $T_{TA}$ value (indicated by reference numeral S240). In the LTE system, for a Time Division Duplex (TDD) mode, when the terminal transmits an uplink signal, the uplink signal is transmitted in advance by adding up a specific constant value to the $T_{TA}$ value. Although the description below is given for advancing the $T_{TA}$ value, it does not exclude an embodiment of adding a certain constant above.

Figure 3:
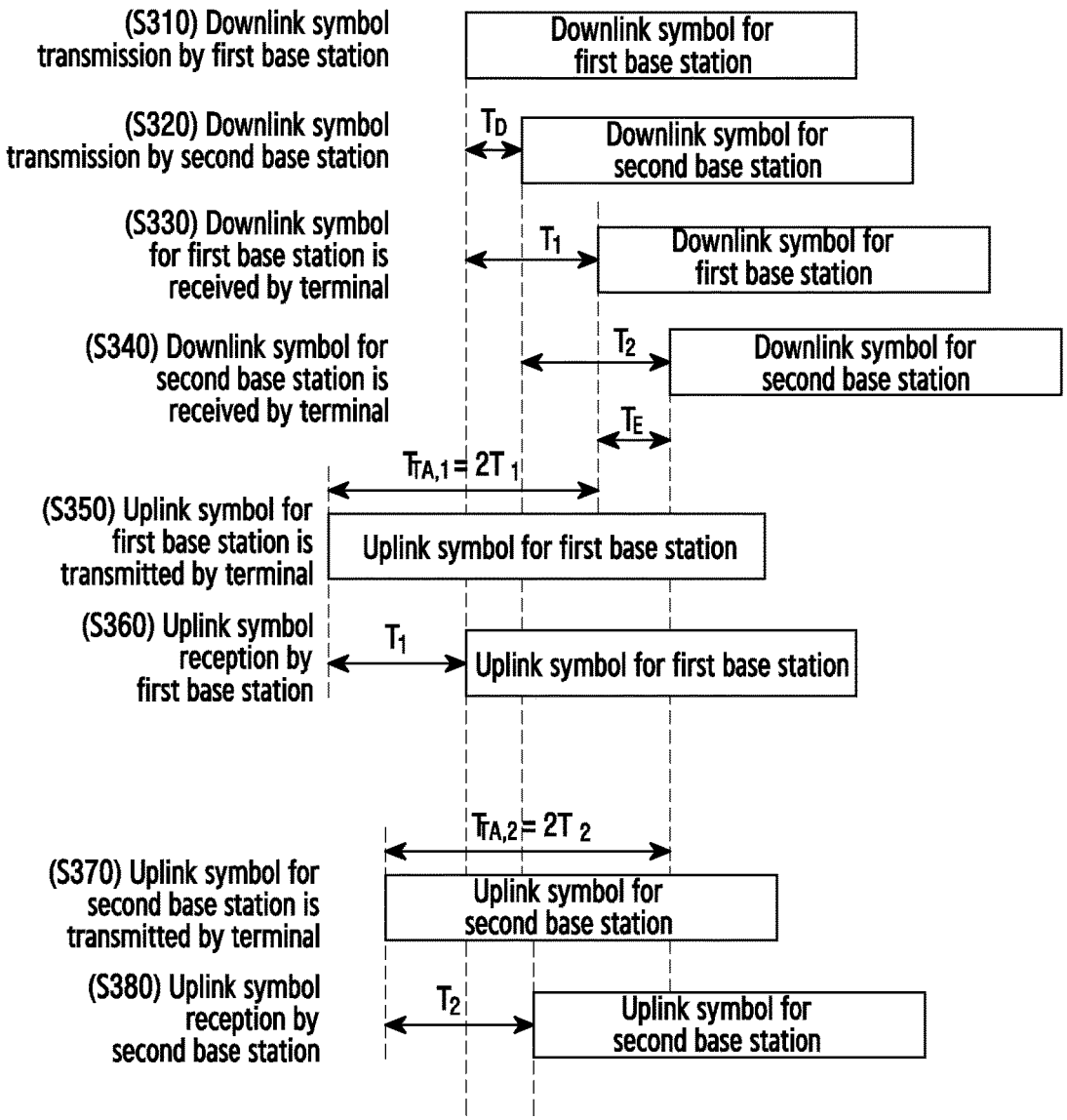
FIG. 3 is a diagram illustrating an example of performing uplink symbol synchronization in a wireless communication system according to embodiments of the present invention.

FIG. 3 is a diagram illustrating an example of performing uplink symbol synchronization in a wireless communication system according to embodiments of the present invention. FIG. 3 shows, when a terminal calculates a TA value for another base station (for example, a second base station) based on a TA value for one base station (for example, a first base station), the relationship of uplink and downlink transmission and reception timings between base stations and a terminal.

Referring to FIG. 3, a downlink symbol transmitted by a first base station (indicated by reference numeral S310) has been delayed by a time $T_1$ and then arrives at the terminal (indicated by reference numeral S330), and a downlink symbol transmitted by a second base station (indicated by reference numeral S320) has been delayed by a time $T_2$ and then arrives at the terminal (indicated by reference numeral S340). The difference between reception timings of two symbols, determined by a terminal, transmitted from the two base stations is referred to as $T_E$ (indicated by reference numeral S350). The time at which the two base stations transmit the downlink symbols differs by $T_D$ (indicated by reference numeral S320). When the terminal receives the TA adjustment message from the first base station to calculate the $T_{TA,1}$ value and knows the same, a $T_{TA,2}$ value for the second base station according to an embodiment of the present invention is calculated by equation (1) as follows.

$$T_{TA,2} = T_{TA,1} + T_{TA,2} - T_{TA,1} \qquad \text{[Equation 1]}$$
$$= T_{TA,1} + 2(T_2 - T_1)$$
$$= T_{TA,1} + 2(T_2 + T_D - T_1) - 2T_D$$
$$= T_{TA,1} + 2T_E - 2T_D$$

Referring to the <Equation 1>, it can be seen that $T_{TA,2}$ value for the second base station can be obtained by adding two times of the $T_E$ value, which is a difference between reception timing of symbols, which are transmitted from the two base stations and received by the terminal, to the $T_{TA,1}$ value for the first base station, and then subtracting from the same a difference $T_D$ between transmission times of downlink symbols transmitted by two base stations. That is, even when the TA adjustment message for the second base station is not received, the terminal may calculate the $T_{TA,2}$ value for the second base station by using $T_{TA,1}$, $T_D$, and $T_E$. The terminal sets the TA value (indicated by reference numeral S370), as shown in <Equation 1>, and transmits the uplink symbol to the second base station (indicated by reference numeral S380).

As described above, the terminal performs the uplink signal synchronization by advancing the $T_{TA,1}$ value from the reception time point of the downlink signal of the first base station and then transmits the same to the first base station (indicated by reference numeral S350). Then, the first base station receives the uplink signal at the time point at which time $T_1$ has elapsed from the time point of transmitting the uplink signal by the terminal (indicated by reference numerals S350 and S360). In addition, the terminal performs the uplink signal synchronization by advancing the $T_{TA,2}$ value from the time point of receiving the downlink signal of the second base station and then transmits the same to the second base station (indicated by reference numeral S370). Then, the second base station receives the uplink signal at the time point at which time $T_2$ has elapsed from the time point of transmitting the uplink signal by the terminal (indicated by reference numerals S370 and S380).

Figure 4:
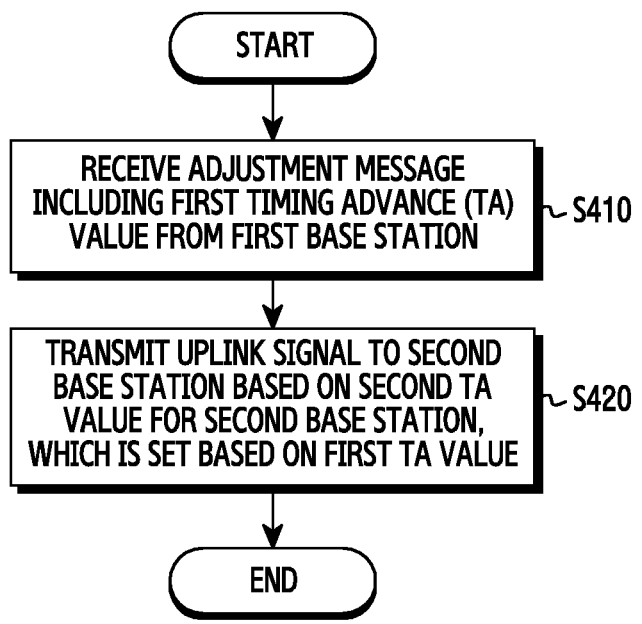
FIG. 4 is a flowchart illustrating an uplink synchronization operation, by a terminal, according to embodiments of the present invention.

FIG. 4 is a flowchart illustrating an uplink synchronization operation, by a terminal, according to embodiments of the present invention. For example, the process flow may be performed by the terminal 100 as shown in FIG. 1A.

Referring to FIG. 4, the terminal 100 receives an adjustment message including a first TA value from the first base station 200 (indicated by reference numeral S410). Next, the terminal transmits an uplink signal to the second base station 300 based on a second TA value for the second base station 300, which is set on the basis of the first TA value (indicated by reference numeral S420).

In an embodiment, the second TA value is determined based on the first TA value, a difference between reception timings of downlink signals, determined by the terminal 100, transmitted from the first base station 200 and second base station 300, and a difference between transmission timings of downlink signals from the first base station 200 and second base station 300.

In an embodiment, the second TA value is set based on the equation as follows: $T_{TA,2}=T_{TA,1}+2T_E-2T_D$. Here, $T_{TA,2}$ denotes a second TA value, $T_{TA,1}$ denotes a first TA value, $T_E$ denotes a difference between reception timings of downlink signals, determined by the terminal 100, transmitted from the first base station 200 and second base station 300, and $T_D$ denotes a difference between transmission timings of downlink signals from the first base station 200 and second base station 300.

In an embodiment, the uplink signal includes a beam training signal.

In an embodiment, the terminal 100 receives, from the first base station 200, an uplink transmission command message toward the second base station 300. For example, the uplink transmission command message may include at least one of sequence information for a beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

In an embodiment, the terminal receives, from the second base station 300, an adjustment message including the second TA value and optimal uplink beam information, and transmits an uplink signal based on the second TA value to the second base station 300, using the optimal uplink beam.

In an embodiment, the first base station 200 and second base station 300 use the same wireless access technology or different wireless access technologies.

In an embodiment, the first base station 200 and second base station 300 are located in the same physical location or different locations.

In an embodiment, the first base station 200 uses a carrier in a first frequency domain, and the second base station 300 uses a carrier in a second frequency domain different from the first frequency domain.

In an embodiment, the structure of the transmission frame (downlink frame or uplink frame) of the first base station 200 and the structure of the transmission frame (downlink frame or uplink frame) of the second base station 300 are different from each other.

Figure 5:
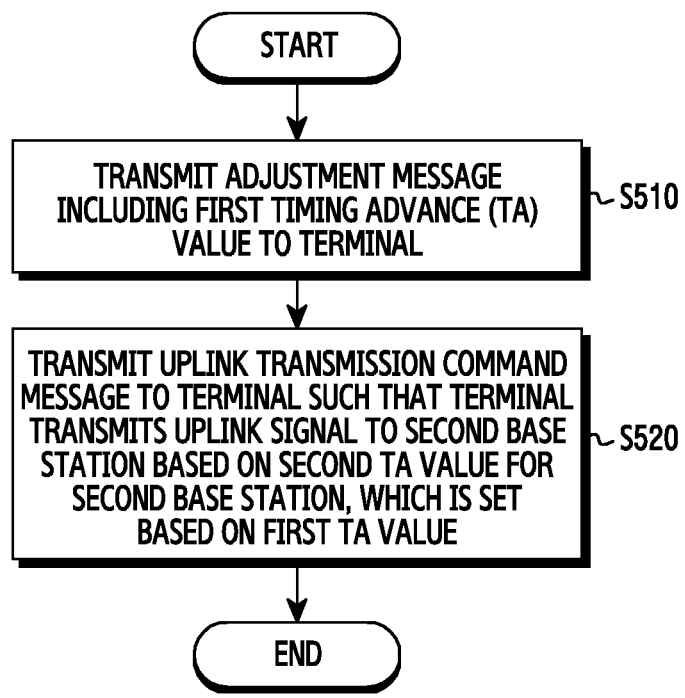
FIG. 5 is a flowchart illustrating an uplink synchronization operation, by a first base station, according to embodiments of the present invention.

FIG. 5 is a flowchart illustrating an uplink synchronization operation, by a first base station, according to embodiments of the present invention. For example, the process flow may be performed by the first base station 200 as shown in FIG. 1A.

Referring to FIG. 5, the first base station 200 transmits an adjustment message including a first TA value to the terminal 100 (indicated by reference numeral S510). Next, the first base station 200 transmits an uplink transmission command message to the terminal 100 such that the terminal 100 transmits an uplink signal to a second base station 300 based on a second TA value for the second base station 300, which is set based on the first TA value (indicated by reference numeral S520).

In an embodiment, the second TA value is set based on the first TA value, a difference between reception timings of downlink signals, determined by the terminal 100, transmitted from the first base station 200 and second base station 300, and a difference between transmission timings of downlink signals from the first base station 200 and the second base station 300.

In an embodiment, the second TA value is set based on the equation as follows, $T_{TA,2}=T_{TA,1}+2T_E-2T_D$. Here, $T_{TA,2}$ denotes a second TA value, $T_{TA,1}$ denotes a first TA value, $T_E$ denotes a difference between reception timings of downlink signals, determined by the terminal 100, transmitted from the first base station 200 and second base station 300, and $T_D$ denotes a difference between transmission timings of downlink signals from the first base station 200 and second base station 300.

In an embodiment, the uplink signal includes a beam training signal.

In an embodiment, the first base station 200 transmits, to the terminal 100, an uplink transmission command message toward the second base station 300. For example, the uplink transmission command message may include at least one of sequence information for the beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

In an embodiment, the first base station 200 and second base station 300 use the same wireless access technology or different wireless access technologies.

In an embodiment, the first base station 200 and second base station 300 are located in the same physical location or different locations.

In an embodiment, the first base station 200 uses a carrier in a first frequency domain, and the second base station 300 uses a carrier in a second frequency domain different from the first frequency domain.

In an embodiment, the structure of the transmission frame (downlink frame or uplink frame) of the first base station 200 and the structure of the transmission frame (downlink frame or uplink frame) of the second base station 300 are different from each other.

Figure 6:
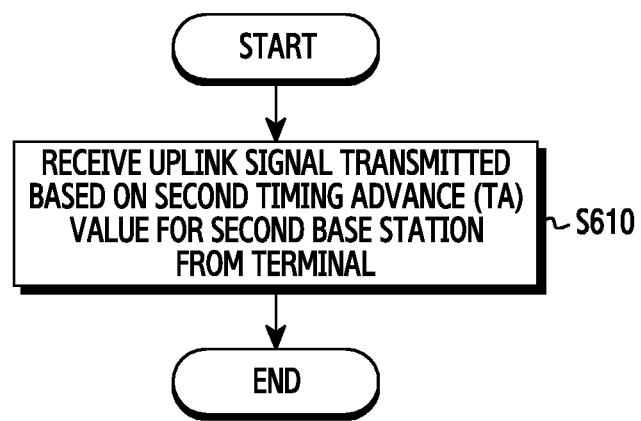
FIG. 6 is a flowchart illustrating an uplink synchronization operation, by a second base station, according to embodiments of the present invention.

FIG. 6 is a flowchart illustrating an uplink synchronization operation, by a second base station, according to embodiments of the present invention. For example, the process flow may be performed by the second base station 300 as shown in FIG. 1A.

Referring to FIG. 6, the second base station 300 receives, from the terminal 100, the uplink signal transmitted on the basis of a second TA value for the second base station 300. The second TA value is set based on a first TA value for the first base station 200.

In an embodiment, the second TA value is set based on the first TA value, a difference between reception timings of downlink signals, determined by the terminal 100, transmitted from the first base station 200 and second base station 300, and a difference between transmission timings of downlink signals from the first base station 200 and the second base station 300.

In an embodiment, the second TA value is set based on equation as follows: $T_{TA,2}=T_{TA,1}+2T_E-2T_D$. Here, $T_{TA,2}$ denotes a second. TA value, $T_{TA,1}$ denotes a first TA value, $T_E$ denotes a difference between reception timings of downlink signals, determined by the terminal 100, transmitted from the first base station 200 and second base station 300, and $T_D$ denotes a difference between transmission timings of downlink signals from the first base station 200 and second base station 300.

In an embodiment, the uplink signal includes a beam training signal. The uplink signal is transmitted by the terminal 100 in response to the fact that the uplink transmission command message toward the second base station 300 has received from the first base station 200. For example, the uplink transmission command message may include at least one of sequence information for a beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

In an embodiment, the second base station 300 may further perform operations of: discovering the optimal uplink beam information of the terminal 100 for the second base station 300, calculating a TA value for the second base station 300, transmitting a message including the calculated TA value and the discovered optimal beam information to the terminal 100, and receiving, from the terminal 100, the uplink signal transmitted based on the calculated TA value, using the optimal uplink beam information.

In an embodiment, the first base station 200 and second base station 300 use the same wireless access technology or different wireless access technologies.

In an embodiment, the first base station 200 and second base station 300 are located in the same physical location or different locations.

In an embodiment, the first base station 200 uses a carrier in a first frequency domain, and the second base station 300 uses a carrier in a second frequency domain different from the first frequency domain.

In an embodiment, the structure of the transmission frame (downlink frame or uplink frame) of the first base station 200 and the structure of the transmission frame (downlink frame or uplink frame) of the second base station 300 are different from each other.

Figure 7:
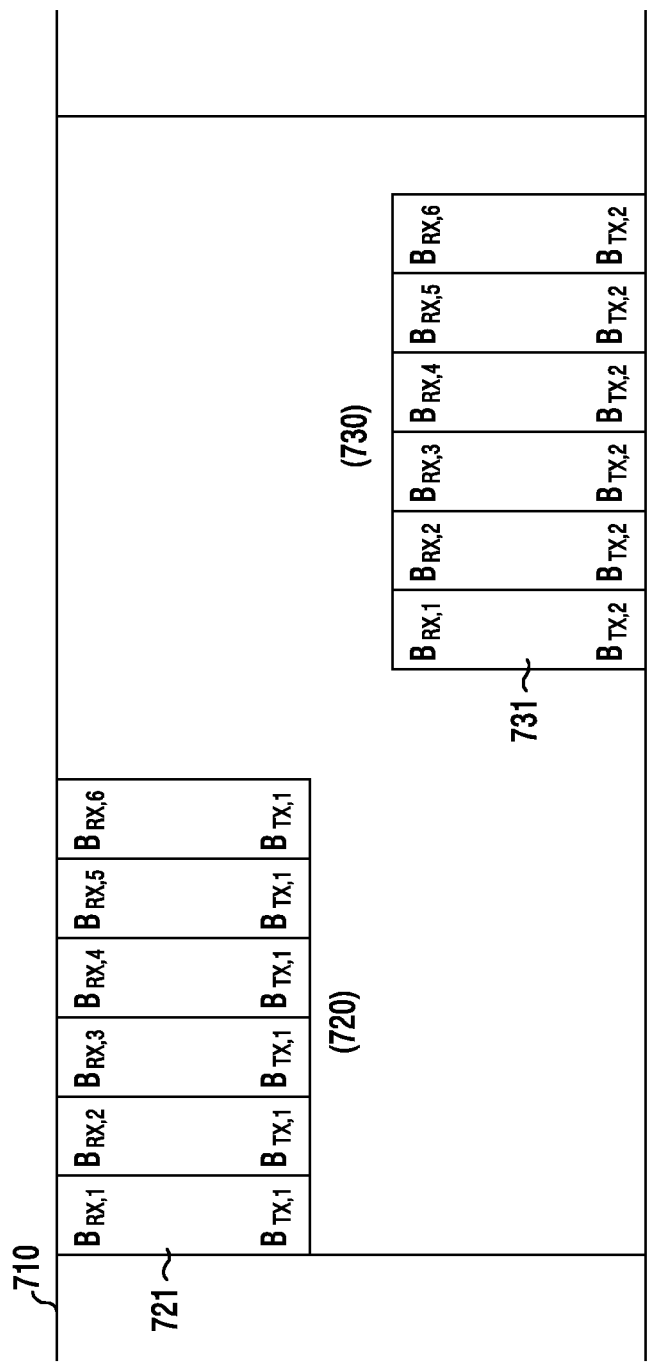
FIG. 7 is a diagram illustrating an example of a transmission frame structure of an uplink signal according to embodiments of the present invention.

FIG. 7 is a diagram illustrating an example of a transmission frame structure of an uplink signal according to embodiments of the present invention. FIG. 7 shows an example of a frame structure of transmitting an uplink beam training signal, when the terminal has two transmission beams and the base station has six reception beams in a beamforming-based wireless communication system.

Referring to FIG. 7, reference numeral 710 represents an uplink frame. The base station allocates uplink resources to be used in the transmission of a beam training signal, by a terminal, in consideration of the number of transmission beams operated by the terminal, the number of reception beams operated by the base station, and the channel quality of the terminal. The terminal transmits signals over six regions 720 including a region 721 by using a first transmission beam, and the base station receives the signals by successively using from a first reception beam to a sixth reception beam. The terminal transmits signals over six regions 730 including a region 731 by using a second transmission beam, and the base station receives the signals by successively using the first reception beam to the sixth reception beam. The base station may allocate large amounts of time resources to a terminal, the channel quality of which is poor, so as to enhance beam training performance of the terminal. On the other hand, the base station may allocate smaller amounts of time resources to a terminal, the channel quality of which is good, so as to reduce overhead. An array antenna is connected to a digital chain of a terminal, and a beam may be formed from the array antenna. When the terminal has multiple digital chains, the terminal may form multiple beams at the same time, so that when the base station simultaneously allocates multiple resources to the terminal on a frequency axis, the terminal may transmit a beam training signal using a different transmission beam for each frequency, so as to reduce the latency of the beam training signal.

When the first base station and second base station are located in different positions, the first base station should transmit location information of the uplink resource to the second base station. In addition, the first base station may also notify of sequence information of the beam training signal to be used by the terminal to the second base station.

In an embodiment, the location information of the uplink resource may be known as system information of the second base station.

Figure 8:
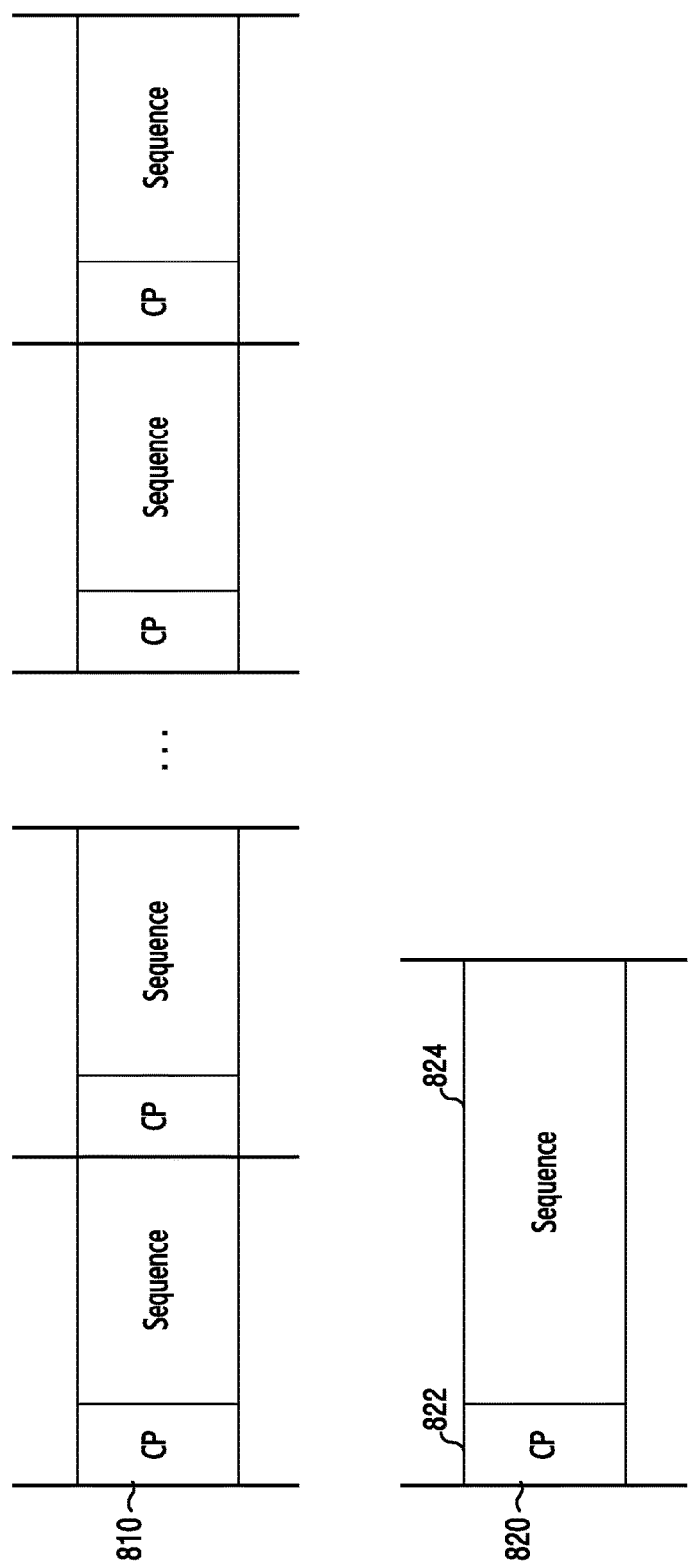
FIG. 8 is a diagram illustrating an example of a structure of an uplink signal according to embodiments of the present invention.

FIG. 8 is a diagram illustrating an example of a structure of an uplink signal according to embodiments of the present invention. FIG. 8 shows a structure of an uplink beam training signal transmitted by a terminal 100 shown in FIG. 1A in a beamforming-based wireless communication system.

Referring to FIG. 8, reference numeral 810 denotes a transmission signal structure when the terminal 100 transmits training signals for a plurality of pairs of transmission and reception beams. A beam training signal 820 for a pair of transmission and reception beams includes a cyclic prefix (CP) 822 and a sequence 824. The base station may not know when the beam training signal transmitted by the terminal is received because distance information with the terminal does not exist. In addition, due to the delay spread of a multi-path of a channel, an interval during which the reception time of the beam training signal is uncertain is further increased. Here, it may be required to determine a CP length, in consideration of the uncertainty of the reception time, such that the CP length is greater than a value obtained by summing up the maximum value of the round-trip delay between the base station and the terminal and a maximum delay spread value of the multi-path.

According to an embodiment of the present invention, a terminal calculates a TA value for the second base station, by using a TA value received from the first base station, a $T_E$ value, which is a difference between reception timings of symbols, determined by the terminal, transmitted from the two base stations, and $T_D$ value, which is a difference between transmission timings of downlink symbols from the two base stations. Since the terminal performs uplink signal synchronization by advancing the uplink signal by the calculated TA value, the uncertainty due to the round-trip delay of the terminal disappears from the uncertainty of the signal reception time by the base station. In other words, it may be accomplished when the CP length is greater than the maximum value of the delay spread of the multi-path. According to the embodiment of the present invention, it is possible to design such that the CP length of the beam training signal is short. Therefore, it is possible to reduce the overhead of uplink resources.

Figure 9:
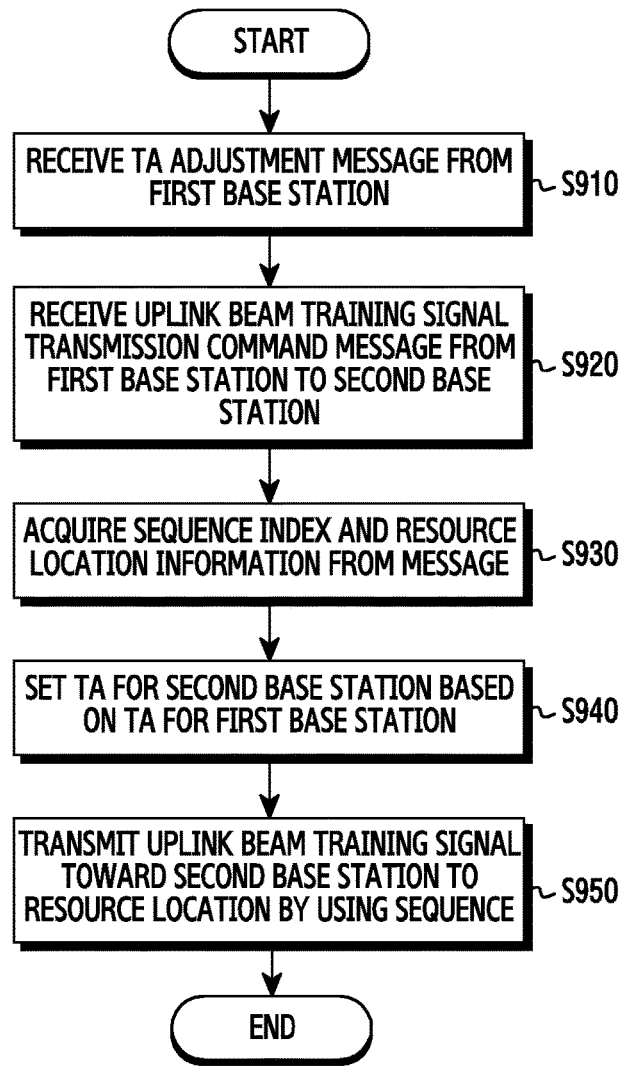
FIG. 9 is a flowchart illustrating an uplink synchronization operation, by a terminal, according to an embodiment of the present invention.

FIG. 9 is a flowchart illustrating an uplink synchronization operation, by a terminal, according to an embodiment of the present invention. The flowchart shows a procedure for transmitting an uplink signal by a terminal when the quality of the signal received by the terminal is good in a beamforming-based wireless communication system, for example, the procedure may be performed by the terminal 100 as shown in FIG. 1A. The quality of the signal received by the terminal may be determined before the uplink signal transmission operation is performed. When the reception signal quality is good, the uplink signal transmission procedure is performed according to the flow shown in FIG. 9. On the other hand, when the reception signal quality is not good, the uplink signal transmission procedure is performed according to a flow shown in FIG. 10, which will be described later.

Referring to FIG. 9, the terminal 100 receives a TA adjustment message from the first base station 200 (S910). Then, the terminal 100 receives a uplink beam training signal transmission message from the first base station 200 to the second base station 300 (S920). Then, the terminal 100 acquires, from the command message, all or part of the information included therein (S930). For example, the beam training command message may include one of information, a combination of two or more pieces of information, or all pieces of information of (i) information on a sequence index of the beam training signal, (ii) information on a time position at which the beam training signal is transmitted, (iii) information on a frequency position at which the beam training signal is transmitted, and (iv) information on the $T_D$ value, which is the difference between transmission timings of downlink symbols by the base stations 200 and 300.

Then, the terminal 100 sets a TA value for the second base station 300 based on the TA value for the first base station (S940). Then, the terminal 100 generates a beam training signal by using the sequence, and transmits the beam training signal, using the resource location, to the second base station 300 (S950).

Figure 10:
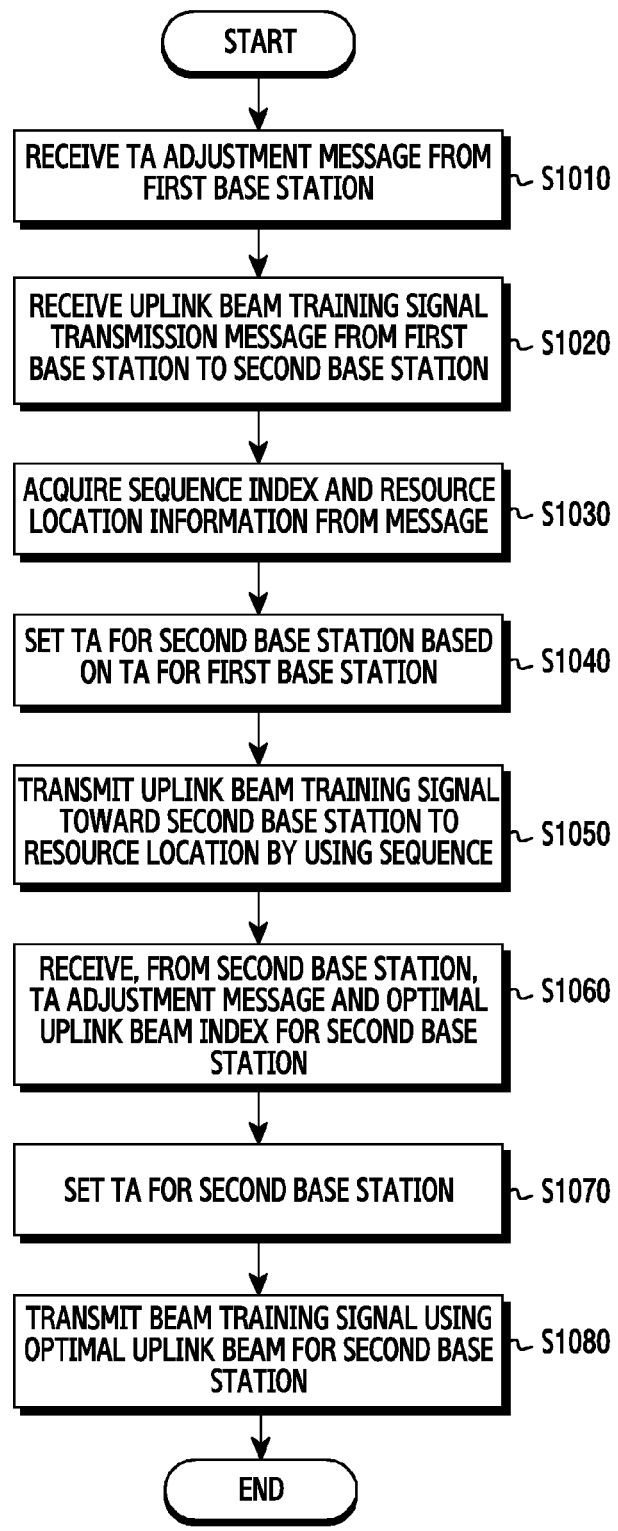
FIG. 10 is a flowchart illustrating an uplink synchronization operation, by a terminal, according to another embodiment of the present invention.

FIG. 10 is a flowchart illustrating an uplink synchronization operation, by a terminal, according to another embodiment of the present invention. The flowchart shows a procedure for transmitting an uplink signal by a terminal when the received signal quality of the terminal is poor in a beamforming-based wireless communication system, for example, the procedure may be performed by the terminal 100 as shown in FIG. 1A. A value indicating the reception signal quality of the terminal may include at least one of path loss, a Signal-to-noise ratio (SNR), a Signal-to-interference ratio (SIR), a Signal-to-interference plus noise ratio (SINR), a Signal-to-leakage plus noise ratio (SLNR), a Reference Signal Strength Indicator (RSSI), a Reference Signal Received Quality (RSRQ), a Reference Signal Received Power (RSRP).

Referring to FIG. 10, the terminal 100 receives a TA adjustment message from the first base station 200 (S1010). Then, the terminal 100 receives an uplink beam training signal transmission message from the first base station 200 to the second base station 300 (S1020). Then, the terminal 100 acquires, from the command message, all or part of the information included therein (S1030). For example, the beam training command message may include one of information, a combination of two or more pieces of information, or all pieces of information of (i) information on a sequence index of the beam training signal, (ii) information on a time position at which the beam training signal is transmitted, (iii) information on a frequency position at which the beam training signal is transmitted, and (iv) information on the $T_D$ value, which is a difference between transmission timings of downlink symbols by the base stations 200 and 300.

Then, the terminal 100 sets a TA value for the second base station 300 based on the TA value for the first base station (S1040). Then, the terminal 100 generates a beam training signal by using the sequence, and transmits the beam training signal, using the resource location, to the second base station 300 (S1050).

Then, the terminal 100 receives a TA adjustment message for the second base station 300 and an optimal uplink transmission beam index for the second base station 300 (S1060). In an embodiment, the terminal 100 receives, from the second base station 300, the TA adjustment message for the second base station 300 and the optimal uplink transmission beam index for the second base station 300. In another embodiment, the terminal 100 receives, from the first base station 200, the TA adjustment message for the second base station 300 and the optimal uplink transmission beam index for the second base station 300.

Then, the terminal 100 sets the TA value for the second base station 300 based on the received TA adjustment message (S1070). Then, the terminal 100 transmits a beam training signal to the second base station 300 using the optimal transmission beam according to the TA value for the second base station 300 (S1080). Here, a sequence used to transmit the beam training signal and location information of the resource may be included in the transmission command message of the uplink beam training signal, or may be acquired according to a predetermined rule. Here, the structure of the beam training signal used in step S1080 and the structure of the beam training signal used in step S1080 may be different. In an embodiment, in step S1050, beam training signals having the structure indicated by reference numeral 810 may be transmitted, and in step S1080, beam training signals having the structure indicated by reference numeral 820, in which the length of sequence is longer than the structure 810, may be transmitted. Accordingly, a beam training signal searching for an optimal uplink beam is shortened to reduce the overhead, and a beam training signal for performing the uplink synchronization is lengthened to enhance the accuracy of the synchronization.

Figure 11:
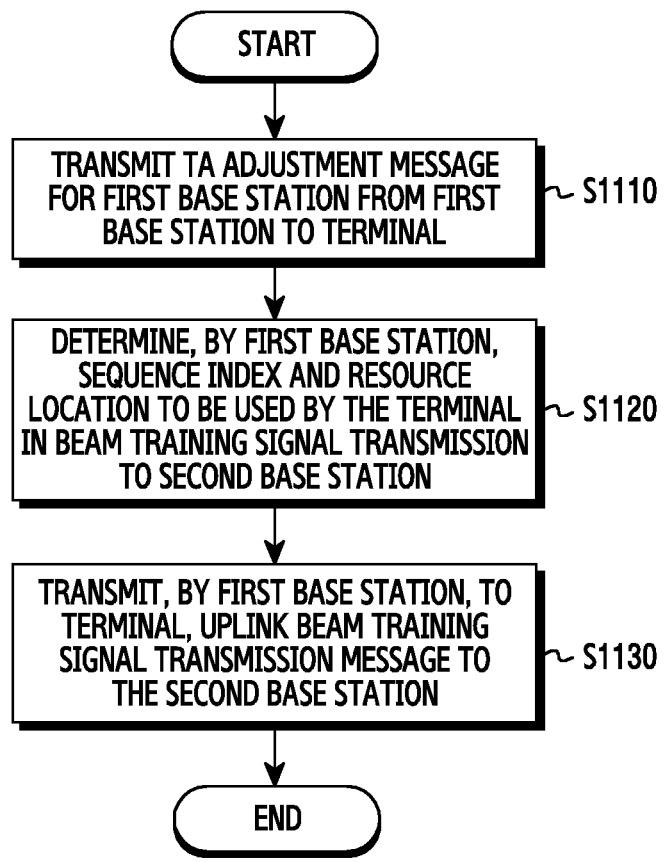
FIG. 11 is a flowchart illustrating an uplink synchronization operation, by a first base station, according to an embodiment of the present invention.

FIG. 11 is a flowchart illustrating an uplink synchronization operation, by a first base station, according to an embodiment of the present invention. The flowchart shows a procedure performed by a first base station such that a second base station in the beamforming-based wireless communication system receives the uplink beam training signal from the terminal, for example, the procedure may be performed by the first base station 200 shown in FIG. 1A.

Referring to FIG. 11, the first base station 200 transmits a TA adjustment message for the first base station to the terminal 100 (S1110). Then, the first base station 200 determines a sequence index and a resource location to be used, by the terminal 100, in the beam training signal transmission to the second base station 300 (S1120). Then, the first base station 200 transmits, to the terminal 100, uplink beam training signal transmission message by the terminal 100, to the second base station 300 (S1130).

Figure 12:
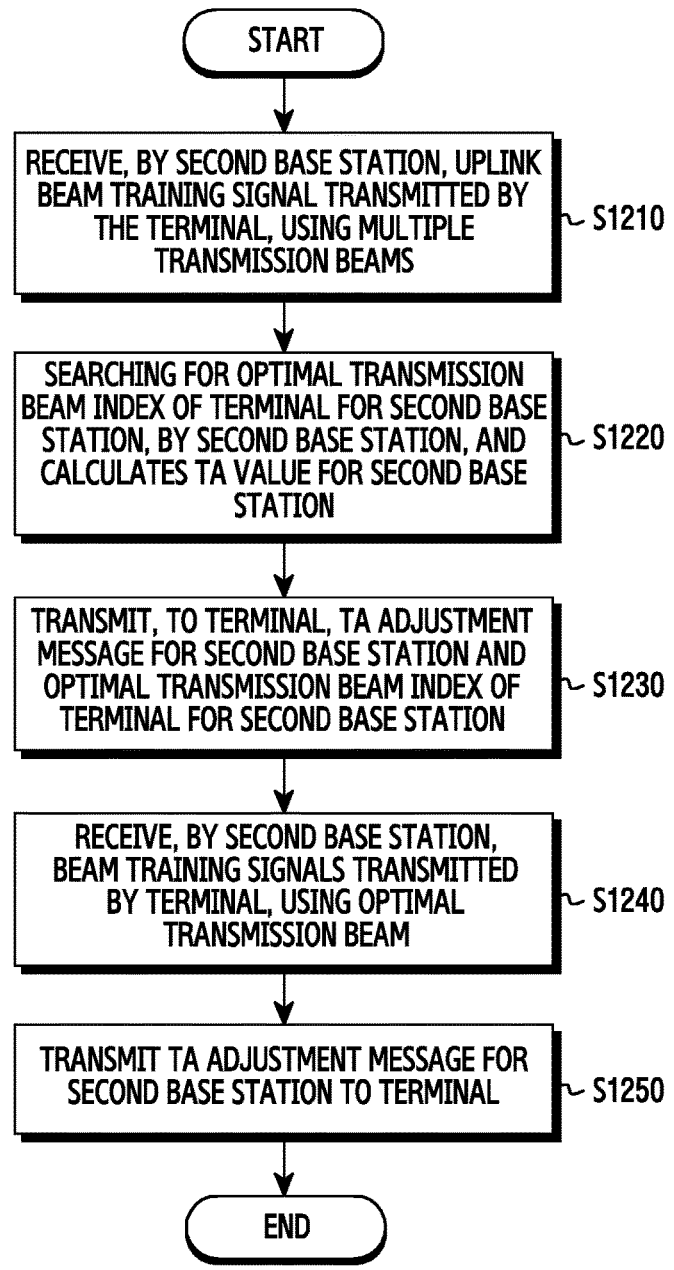
FIG. 12 is a flowchart illustrating an uplink synchronization operation, by a second base station, according to an embodiment of the present invention.

FIG. 12 is a flowchart illustrating an uplink synchronization operation, by a second base station, according to an embodiment of the present invention. The flowchart shows a procedure performed by a second base station such that the second base station in the beamforming-based wireless communication system receives the uplink beam training signal from the terminal, for example, the procedure may be performed by the second base station 300 shown in FIG. 1A.

Referring to FIG. 12, the second base station 300 receives the uplink beam training signal transmitted, by the terminal 100, using a plurality of transmission beams (S1210). Then, the second base station 300 searches for the optimal transmission beam index of the terminal 100 for the second base station, using the received beam training signal, and calculates the TA value for the second base station (S1220). Then, the second base station 300 transmits, to the terminal 100, a TA adjustment message for the second base station and an optimal transmission beam index of the terminal for the second base station (S1230). Then, the second base station 300 receives the beam training signals transmitted by the terminal 100, using the optimal transmission beam (S1240). Then, the second base station 300 transmits the TA adjustment message for the second base station to the terminal 100 (S1250).

Figure 13:
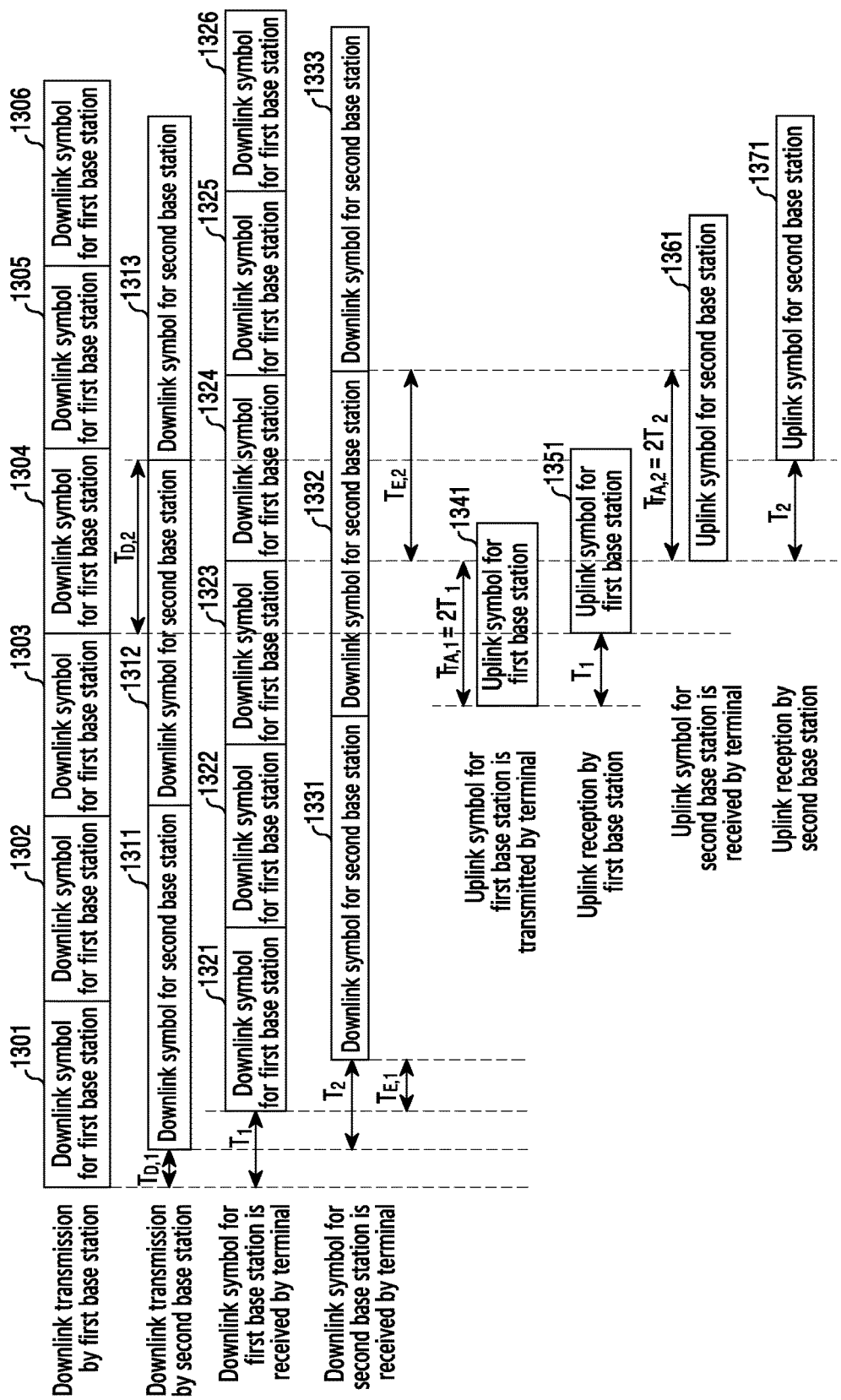
FIG. 13 is a diagram illustrating a relationship of uplink and downlink transmission and reception timings between base stations and a terminal, when symbol lengths are different between two base stations for performing uplink synchronization operation according to embodiments of the present invention.

FIG. 13 illustrates a relationship of uplink and downlink transmission and reception timings between base stations and a terminal, when symbol lengths of two base stations are different from each other, in which the TA value for one base station is calculated based on the TA value for one other base station according to embodiments of the present invention. For example, FIG. 13 illustrates a case where the length of the transmission frame of the first base station 200 is longer than the length of the transmission frame of the second base station 300, shown in FIG. 1A.

Referring to FIG. 13, the lengths of downlink symbols 1301 to 1306, transmitted by the first base station 200, are different from the lengths of downlink symbols 1311 to 1313, transmitted by the second base station 300. Here, depending on which symbol is used as a basis, a difference between reception timings of symbols, determined by the terminal 100, transmitted from two base stations may be different from a difference between transmission timings of downlink symbols by the two base stations. A downlink symbol 1301 transmitted by the first base station 200 is delayed by time $T_1$ and then arrives at the terminal 100 at a symbol time indicated by reference numeral 1321. On the other hand, a downlink symbol 1311 transmitted by the second base station 300 is delayed by time $T_2$ and then arrives at the terminal 100 at a symbol time indicated by reference numeral 1331. A difference between reception timings of symbols 1321 and 1331, determined by the terminal 100, transmitted from two base stations is referred to as $T_{E,1}$. The transmission timings of downlink symbols 1301 and 1311 by the two base stations differ by $T_{D,1}$.

A downlink symbol 1304 transmitted by the first base station 200 is delayed by time $T_1$ and then arrives at the terminal 100 at a symbol time indicated by reference numeral 1324. On the other hand, a downlink symbol 1313 transmitted by the second base station 300 is delayed by time $T_2$ and then arrives at the terminal 100 at a symbol time indicated by reference numeral 1333. A difference between reception timings of the symbols 1324 and 1333, determined by the terminal 100, transmitted from two base stations is referred to as $T_{E,2}$. The transmission timings of downlink symbols 1304 and 1313 transmitted by the two base stations differ by $T_{D,1}$. Here, $T_{E,1}$ and $T_{E,2}$ may be different from each other. Similarly, $T_{D,1}$ and $T_{D,2}$ may be different from each other.

When the terminal 100 receives the TA adjustment message from the first base station 200 and knows the $T_{TA,1}$ value, in order to use a method of calculating $T_{TA,2}$ value for the second base station 300, a symbol should be appropriately selected, which is used as a basis when calculating a difference between reception timings of symbols, determined by the terminal 100, transmitted from two base stations and a difference between transmission timings of downlink symbols transmitted from the two base stations. Referring to FIG. 13, when the terminal 100 is to synchronize the uplink symbol transmission time for the first base station 200 based on the start time of a symbol 1324 to be received by the terminal 100, and is to synchronize the uplink symbol transmission time for the second base station 300 based on the start time of a symbol 1333 to be received by the terminal 100, the terminal 100 should calculate a difference between transmission timings of downlink symbols transmitted by the two base stations based on the symbol 1304 and symbol 1313, and calculate a difference between reception timings of symbols received form the two base stations based on the symbol 1324 and symbol 1333. Here, even when information on $T_{D,1}$ is received from the base station, $T_{D,2}$ may be calculated by using a difference between symbol lengths of two base stations. In addition, when the terminal calculates a $T_{E,1}$, $T_{E,2}$ may be calculated using the difference of symbol lengths of two base stations.

Figure 14:
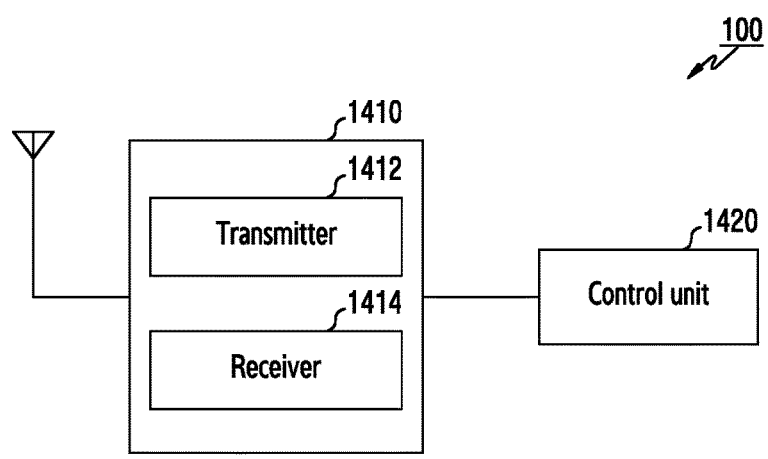
FIG. 14 is a diagram showing a block configuration of a terminal device for uplink synchronization operations according to embodiments of the present invention.

FIG. 14 is a diagram showing a block configuration of a terminal device for performing uplink synchronization operations according to embodiments of the present invention. For example, the block configuration may be implemented by the terminal 100 as shown in FIG. 1A.

Referring to FIG. 14, the terminal 100 includes a transceiver 1410 and a control unit 1420. The transceiver 1410 includes a transmitter 1412 and a receiver 1414. The control unit 1420 controls the transmitter 1412 and receiver 1414 according to uplink synchronization operations according to embodiments of the present invention. For example, the control unit 1420 controls the way that operations according to the flow shown in FIG. 4, the flow shown in FIG. 9 or FIG. 10 are performed.

The receiver 1414 receives an adjustment message including a first TA value from the first base station 200. The transmitter 1412 transmits an uplink signal to the second base station 300 based on a second TA value for the second base station 300, which is set based on a first TA value.

In an embodiment, the second TA value is set based on the first TA value, a difference between reception timings of downlink signals being transmitted from the first base station 200 and second base station 300 and received by the terminal 100, and a difference between transmission timings of downlink signals transmitted from the first base station 200 and second base station 300.

In an embodiment, the second TA value is set based on equation as follows: $T_{TA,2} = T_{TA,1} + 2T_E - 2T_D$. Here, $T_{TA,2}$ denotes a second TA value, $T_{TA,1}$ denotes a first TA value, $T_E$ denotes a difference between reception timings of downlink signals transmitted from the first base station 200 and second base station 300 and received by the terminal 100, and $T_D$ denotes a difference between transmission timings of downlink signals transmitted from the first base station 200 and second base station 300.

In an embodiment, the uplink signal includes a beam training signal.

In an embodiment, the terminal 100 receives an uplink transmission command message toward the second base station 300 from the first base station 200. For example, the uplink transmission command message may include at least one of sequence information for a beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

In an embodiment, the terminal receives, from the second base station 300, an adjustment message including the second TA value and optimal uplink beam information, and transmits an uplink signal based on the second TA value to the second base station 300, using the optimal uplink beam information.

Figure 15:
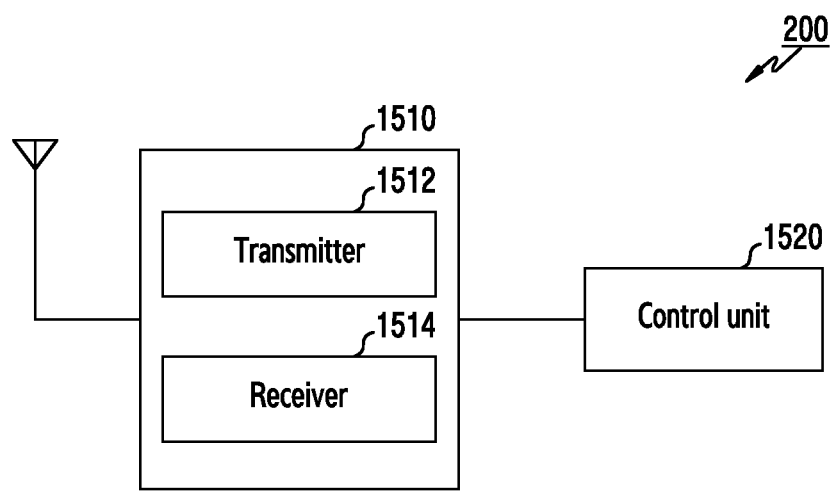
FIG. 15 is a diagram showing a block configuration of a first base station for uplink synchronization operations according to embodiments of the present invention.

FIG. 15 is a diagram showing a block configuration of a first base station for uplink synchronization operations according to embodiments of the present invention. For example, the block configuration may be performed by the first base station 200 shown in FIG. 1A.

Referring to FIG. 15, the first base station 200 includes a transceiver 1510 and control unit 1520. The transceiver 1510 includes a transmitter 1512 and a receiver 1514. The control unit 1520 controls the transmitter 1512 and receiver 1514 according to uplink synchronization operations according to embodiments of the present invention. For example, the control unit 1520 controls such a way that operations according to the flow shown in FIG. 5 and FIG. 11 are performed.

The transmitter 1512 transmits an adjustment message including a first TA value to the terminal 100. In addition, the transmitter 1512 transmits an uplink transmission command message to the terminal 100 such that the terminal transmits an uplink signal to the second base station 300 based on a second TA value for the second base station 300, which is set based on the first TA value.

In an embodiment, the second TA value is set based on the first TA value, a difference between reception timings of downlink signals being transmitted from the first base station 200 and second base station 300 and received by the terminal 100, and a difference between transmission timings of downlink signals transmitted from the first base station 200 and the second base station 300.

In an embodiment, the second TA value is set based on equation as follows: $T_{TA,2}=T_{TA,1}+2T_E-2T_D$. Here, $T_{TA,2}$ denotes a second TA value, $T_{TA,1}$ denotes a first TA value, $T_E$ denotes a difference between reception timings of downlink signals transmitted from the first base station 200 and second base station 300 and received by the terminal 100, and $T_D$ denotes a difference between transmission timings of downlink signals transmitted from the first base station 200 and second base station 300.

In an embodiment, the uplink signal includes a beam training signal.

In an embodiment, the terminal 200 transmits, to the terminal 100, an uplink transmission command message toward the second base station 300. For example, the uplink transmission command message may include at least one of sequence information for a beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

Figure 16:
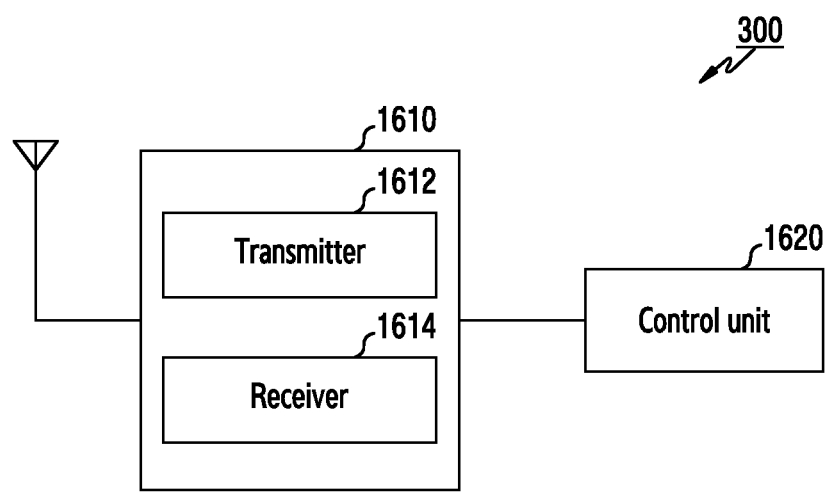
FIG. 16 is a diagram showing a block configuration of a second base station for uplink synchronization operations according to embodiments of the present invention.

FIG. 16 is a diagram showing a block configuration of a second base station for uplink synchronization operations according to embodiments of the present invention. For example, the block configuration may be performed by the second base station 300 shown in FIG. 1A.

Referring to FIG. 16, the second base station 300 includes a transceiver 1610 and control unit 1620. The transceiver 1610 includes a transmitter 1612 and a receiver 1614. The control unit 1620 controls the transmitter 1612 and receiver 1614 according to uplink synchronization operations according to embodiments of the present invention. For example, the control unit 1620 controls such a way that operations according to the flow shown in FIG. 6 and FIG. 12 are performed.

The receiver 1614 receives, from the terminal 100, an uplink signal transmitted on the basis of the second value TA for the second base station 300. The second TA value is set based on a first TA value for the first base station 200.

In an embodiment, the second TA value is set based on the first TA value, a difference between reception timings of downlink signals being transmitted from the first base station 200 and second base station 300 and received by the terminal 100, and a difference between transmission timings of downlink signals transmitted from the first base station 200 and second base station 300.

In an embodiment, the second TA value is set based on equation as follows: $T_{TA,2}=T_{TA,1}+2T_E-2T_D$. Here, $T_{TA,2}$ denotes a second TA value, $T_{TA,1}$ denotes a first TA value, $T_E$ denotes a difference between reception timings of downlink signals transmitted from the first base station 200 and second base station 300 and received by the terminal 100, and $T_D$ denotes a difference between transmission timings of downlink signals transmitted from the first base station 200 and second base station 300.

In an embodiment, the uplink signal includes a beam training signal. The uplink signal is transmitted by the terminal 100 in response to the fact that the uplink transmission command message toward the second base station 300 has received from the first base station 200. For example, the uplink transmission command message may include at least one of sequence information for a beam training signal, and a resource location to which the beam training signal is transmitted. In an embodiment, the sequence information includes an index indicating a sequence for the beam training signal. In this case, the terminal transmits the beam training signal including a sequence corresponding to the index to the second base station 300. In another embodiment, the terminal transmits the beam training signal at the resource location to the second base station 300.

In an embodiment, the second base station 300 may further perform operations of: discovering optimal uplink beam information of the terminal 100 with respect to the second base station 300, calculating a TA value for the second base station 300, transmitting a message including the calculated TA value and the discovered optimal uplink beam information to the terminal 100, and receiving, from the terminal 100, the uplink signal transmitted based on the calculated TA value, using the optimal uplink beam information.

The first base station 200 and second base station 300 shown in FIGS. 15 and 16 may use the same wireless access technology or different wireless access technologies. The first base station 200 and second base station 300 are located in the same physical location or different locations. The first base station 200 uses a carrier in a first frequency domain, and the second base station 300 uses a carrier in a second frequency domain different from the first frequency domain. The transmission frame structure of the first base station 200 and the transmission frame structure of the second base station 300 may be different from each other.

According to embodiments of the present invention described above, it is possible to reduce the overhead of an uplink resource by adjusting the time at which an uplink signal is transmitted to other base stations or other cells, using information for uplink synchronization (for example, TA value) in one base station or one cell in a wireless communication system.

Although the present invention has been described by the restricted embodiments and the drawings as described above, the present invention is not limited to the aforementioned embodiments, and various modifications and alterations can be made from the descriptions by those skilled in the art to which the present invention pertains. For example, embodiments of the present invention have been described as an example, which can be applied to a wireless communication system shown in FIG. 1A, it will be identically applied to a case where carriers of base stations in different locations or majority carriers of base stations in the same location, as shown in FIGS. 1B and 1C as described above, perform a service using a carrier aggregation technology.

Further, the operations according to embodiments of the present invention may be implemented by a single processor. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. An apparatus for a terminal in a wireless communication system, the apparatus comprising:
   a receiver configured to receive, from a first base station, an adjustment message including a first timing advance (TA) value and an uplink transmission command message including information on a first difference between transmission timings of downlink signals from the first base station and a second base station; and
   a transmitter configured to transmit, to the second base station, an uplink signal based on a second TA value for the second base station, which is determined based on the first TA value, the first difference, and a second difference between reception timings of downlink signals being transmitted from the first base station and the second base station.

2. The apparatus of claim 1, wherein the second TA value is determined based on an equation as follows: $T_{TA,2} = T_{TA,1} + 2T_E - 2T_D$, where $T_{TA,2}$ denotes the second TA value, $T_{TA,1}$ denotes the first TA value, $T_E$ denotes the second difference between reception timings of downlink signals transmitted from the first base station and the second base station and received by the terminal, and $T_D$ denotes the first difference between transmission timings of downlink signals transmitted from the first base station and the second base station.

3. The apparatus of claim 1,
   wherein the uplink signal includes a beam training signal,
   wherein the uplink signal is transmitted by the terminal in response to a reception of the uplink transmission command message to the second base station from the first base station, and
   wherein the uplink transmission command message includes at least one of information on a sequence for the beam training signal and a resource location to which the beam training signal is transmitted.

4. The apparatus of claim 3,
   wherein the information on the sequence includes an index indicating the sequence for the beam training signal, and
   wherein the beam training signal including a sequence corresponding to the index is transmitted from the terminal to the second base station at the resource location.

5. The apparatus of claim 3,
   wherein the receiver further receives, from the second base station, an adjustment message including a second TA value and information on an optimal uplink beam, and
   the transmitter further transmits, to the second base station, an uplink signal based on the second TA value, using the optimal uplink beam.

6. The apparatus of claim 1, wherein the first base station and the second base station use a same technology or different wireless access technologies.

7. The apparatus of claim 6, wherein:
   the first base station and the second base station are located in different locations,
   the first base station uses a carrier in a first frequency domain, and the second base station uses a carrier in a second frequency domain different from the first frequency domain, and
   a transmission frame structure of the first base station and a transmission frame structure of the second base station are different from each other.

8. An apparatus for a first base station in a wireless communication system, the apparatus comprising:
   a control unit configured to generate an adjustment message including a first timing advance (TA) value and an uplink transmission command message including information on a first difference between transmission timings of downlink signals from the first base station and a second base station; and a transmitter, wherein the transmitter transmits the adjustment message, and transmits the uplink transmission command message to a terminal such that the terminal transmits an uplink signal to the second base station based on a second TA value for the second base station, which is determined based on the first TA value, the first difference, and a second difference between reception timings of downlink signals being transmitted from the first base station and the second base station.

9. The apparatus of claim 8, wherein the second TA value is determined based on an equation as follows: $T_{TA,2}= T_{TA,1}+2T_E-2T_D$, where $T_{TA,2}$ denotes the second TA value, $T_{TA,1}$ denotes the first TA value, $T_E$ denotes the second difference between reception timings of downlink signals transmitted from the first base station and the second base station and received by the terminal, and $T_D$ denotes the first difference between transmission timings of downlink signals transmitted from the first base station and the second base station.

10. The apparatus of claim 8, wherein the uplink signal includes a beam training signal, wherein the uplink signal is transmitted by the terminal in response to a reception of the uplink transmission command message to the second base station from the first base station, and wherein the uplink transmission command message includes at least one of information on a sequence for the beam training signal, a resource location to which the beam training signal is transmitted.

11. The apparatus of claim 10, wherein the information on the sequence includes an index indicating the sequence for the beam training signal, and wherein the beam training signal including a sequence corresponding to the index is transmitted from the terminal to the second base station at the resource location.

12. An apparatus for a second base station in a wireless communication system, the apparatus comprising:

a receiver configured to receive, from a terminal, an uplink signal transmitted based on a second timing advance (TA) value for the second base station, wherein the second TA value is determined based on a first TA value for a first base station, a first difference between transmission timings of downlink signals from the first base station and the second base station which is transmitted from the first base station to the terminal through an uplink transmission command message, and a second difference between reception timings of downlink signals being transmitted from the first base station and the second base station.

13. The apparatus of claim 12, wherein the second TA value is determined based on equation as follows: $T_{TA,2}= T_{TA,1}+2T_E-2T_D$, where $T_{TA,2}$ denotes the second TA value, $T_{TA,1}$ denotes the first TA value, $T_E$ denotes the second difference between reception timings of downlink signals transmitted from the first base station and the second base station and received by the terminal, and $T_D$ denotes the first difference between transmission timings of downlink signals transmitted from the first base station and the second base station.

14. The apparatus of claim 12, wherein the uplink signal includes a beam training signal, wherein the uplink signal is transmitted by the terminal in response to a reception of the uplink transmission command message to the second base station from the first base station, and wherein the uplink transmission command message includes at least one of information on a sequence for the beam training signal, a resource location to which the beam training signal is transmitted.

15. The apparatus of claim 12, further comprising:

a control unit configured to determine an optimal uplink beam for the terminal with respect to the second base station, and determine a TA value for the second base station; and a transmitter configured to transmit, to the terminal, a message including the determined TA value and information on the determined optimal uplink beam, wherein the receiver further receives, from the terminal, an uplink signal transmitted on the basis of the determined TA value, using the optimal uplink beam.

16. The apparatus of claim 12, wherein the first base station and the second base station use a same wireless access technology or different wireless access technologies.

17. The apparatus of claim 16, wherein the first base station and the second base station are located in a physically same location or different locations, wherein the first base station uses a carrier in a first frequency domain, and the second base station uses a carrier in a second frequency domain different from the first frequency domain, and wherein a transmission frame structure of the first base station and a transmission frame structure of the second base station are different from each other.

* * * * *